ELECTROMECHANICAL MULTIPLIER

Filed Dec. 1, 1948 2 Sheets-Sheet 1

Inventor
JOHN W. GRAY

By [signature]
Attorney

Dec. 14, 1954 J. W. GRAY 2,696,946

ELECTROMECHANICAL MULTIPLIER

Filed Dec. 1, 1948 2 Sheets-Sheet 2

Inventor

JOHN W. GRAY

By

[signature]

Attorney 2,696,946

ELECTROMECHANICAL MULTIPLIER

John W. Gray, White Plains, N. Y., assignor to General Precision Laboratory Incorporated, a corporation of New York Application December 1, 1948, Serial No. 62,947

13 Claims. (Cl. 235—61)

This invention relates to a computer of the class of continuously acting computing instruments known as function generators.

A purpose of this invention is the provision of a mechanism and method for resolving a vector quantity into its two-dimensional coordinates by the trigonometric solution of a right triangle. This involves, in the solution for each of the two coordinates, the finding of the sine or cosine of a given angle and the multiplication of that sine or cosine by a given factor.

Another purpose of this invention is the provision of mechanisms and methods for the electrical conversion of an input angle into the sine or cosine of that angle and the multiplication of the result by a second input datum in the form of an electrical magnitude, the result or output of the device being furnished in a form which can be conveniently integrated.

Still another purpose of this invention is the provision of mechanisms and methods for finding any desired function of an angle and multiplying the function by one or two factors.

These purposes are accomplished by the provision of a function generator for generating the functions $$Y=cX \sin Z$$
$$Y=cX \cos Z$$

or $$Y=cXF(Z)$$

where there are two variable inputs, X and Z, and where $c$ is a constant input quantity, or for generating the functions $$Y=WX \sin Z$$
$$Y=WX \cos Z$$

or $$Y=WXF(Z)$$

where W, X, and Z are input quantities and each is independently variable.

Such a function generator can be used for the solution of problems involving two independent variables such as the solution of a right triangle when the hypotenuse and one acute angle are given. It may thus be of use in numerous fields, for example, in navigation and in fire control equipment. It is of particular use in the resolution of a straight line having magnitude and direction into two mutually perpendicular coordinates in its plane, and may be applied, for instance, to the resolution of the speed of a vehicle in any direction on the earth's surface into its coordinate speeds in the north-south and east-west directions.

Such a function generator can also be used for the solution of problems involving three independent variables as, for instance, in the resolution of the speed of an aeroplane into its north-south or east-west component with correction for the geoidal shape of the earth. This is of particular importance in polar avigation. In the solution of such a problem the speed on course of the aeroplane would be multiplied by the sine or cosine of the course azimuth angle and by a function of the latitude. The product, integrated, would represent the present latitude or longitude of the aeroplane corrected for the departure of the earth's shape from sphericity.

The function generator consists principally of an electrostatic variable condenser and a converter for the production of a direct electrical current the magnitude of which is proportional to the setting of the condenser and to the frequency and voltage magnitude of alternating current supplied to the condenser.

This invention utilizes as input data the frequency of an electrical alternating current, the voltage magnitude of the same alternating current, and a mechanical angle, and produces as output another electrical magnitude. When two outputs representing both mutually perpendicular coordinate magnitudes are desired, two such devices are required. One utility of this invention lies in its provision of a simple, automatic, and continuous solution of the above-described avigational problem when the inputs are a frequency and an angle, or a voltage, a frequency, and an angle, with the presentation of the output data in easily usable electrical form, readily integrated if required. The solution is obtained without use of moving parts except for the shaft for setting the input angle.

The output of this invention, which may be an electrical voltage or current, can be employed to energize an integrator which may be of any one of a number of types, so that if the problem to be solved is that of the resolution of the movement of a vehicle over the earth's surface into north and east components, the total distance traveled in latitude or in longitude will be given by the output of the integrator, either in miles, in degrees of latitude or longitude, or in present position in degrees, while the instantaneous rate of travel in latitude or longitude constitutes the input to the integrator. Such an integrator is described in a copending application, Serial No. 51,610 filed September 28, 1948 of John W. Gray, now Patent No. 2,622,231.

There are a number of computing mechanisms for finding the sine or cosine of an angle, and for multiplying two quantities, such as the sine-cosine potentiometer, two-phase electromagnetic solver, ball-disc variable speed drive, pin cams and differentials, and various arrangements of two-dimensional and three-dimensional cams with Scotch yokes or other follower arrangements. Some of these mechanisms involve the movement of mechanical linkages, others are cumbersome and expensive, or are not easily adaptable to the input and output data here employed.

The instant invention requires very few and simple components which may be easily designed to give results of very high precision, and which have a minimum of moving parts. These components include primarily only a condenser for developing the sine, cosine, or other function and a converter composed of four thermionic diodes.

The exact nature of the invention will be more readily apparent from the detailed description when taken together with the accompanying drawings, in which.

Figure 1:
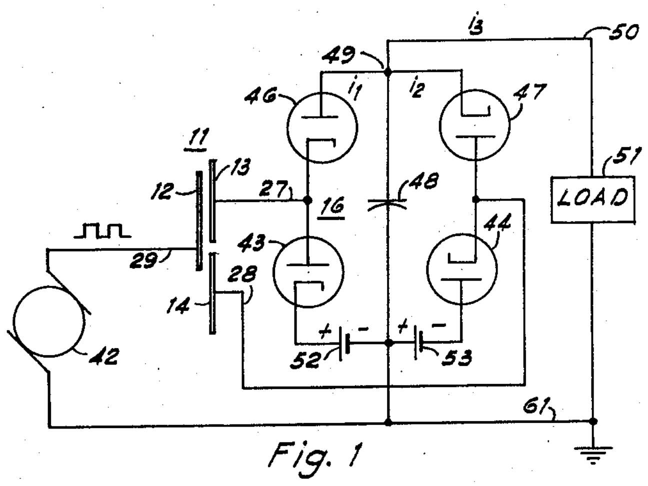
Figure 1 is a schematic diagram of one embodiment of the computer.

One embodiment is shown in Figure 1, in which a differential, variable, air dielectric, electrostatic, sine condenser 11 consists of a movable set of rotor plates 12, one fixed set of stator plates 13 and a second fixed set of stator plates 14. An alternating voltage input, indicated diagrammatically by the generator 42, is fed to rotor 12 and the output derived from the two sets of stator plates is fed to a diode bridge 16. This condenser is termed "differential" because it is actually two condensers, the capacitance of one decreasing when the other increases and the difference between these two capacitances at any time, or the "differential" capacitance, is effectively utilized. The output of the computer is proportional to this differential. One capacitance exists between rotor 12 and stator 13, while the second capacitance exists between the same rotor 12 and stator 14.

Figure 3:
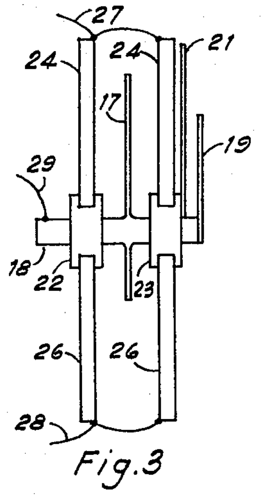
Figure 3 is a side view of the sine condenser of Fig. 2.
Figure 2:
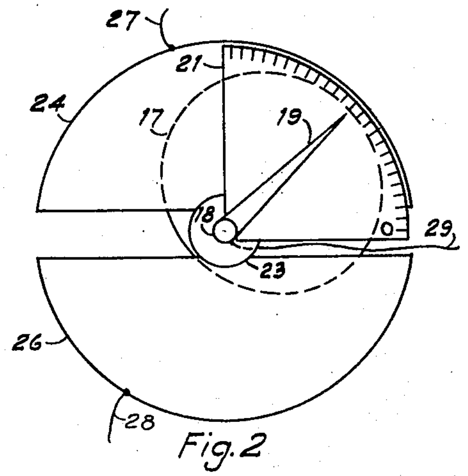
Figure 2 is a front view of a sine condenser adapted for use in the computer of the instant invention.

The mechanical construction of this condenser is such that its differential capacitance is proportional to the sine of its angular setting, that is $$C_1 - C_2 \sim \sin\theta \quad (1)$$

where $C_1$ is the capacity between rotor 12 and stator 13, $C_2$ is the capacity between rotor 12 and stator 14, and $\theta$ is the angle of adjustment of the condenser rotor shaft. This is further illustrated in Figs. 2 and 3 showing a front and side view of such a sine condenser. The set of rotor plates is represented by a single plate, 17, of approximately elliptical shape, fastened to shaft 18 by which the rotor can be rotated. The shaft 18 bears a pointer 19 lying in the direction of the shortest dimension of the rotor, for reading on a dial 21 the angle of setting of the rotor. When the condenser is applied to computation of the sine of an angle the zero of the scale is positioned as shown between the two stator sets of plates while for computation of the cosine of an angle the zero is displaced 90° from this point, and such a condenser, otherwise identical with a sine condenser, is here termed a cosine condenser. It is to be understood that descriptions herein of sine condensers apply equally to the cosine type except for this difference in zero of the angular data input.

The shaft is borne by two insulating blocks, 22 and 23, which support it mechanically on the stator plates while insulating it electrically from them. The two sets of stator plates, 13 and 14 in Fig. 1, are indicated in Figs. 2 and 3 by two semi-circular plates 24 constituting the first set, and two semi-circular plates 26 constituting the second set. These stator plates are preferably made larger than the rotor to minimize edge effects. All of the first set of stator plates are connected to conductor 27, all of the second set to lead 28 and the rotor to conductor 29.

Figure 4:
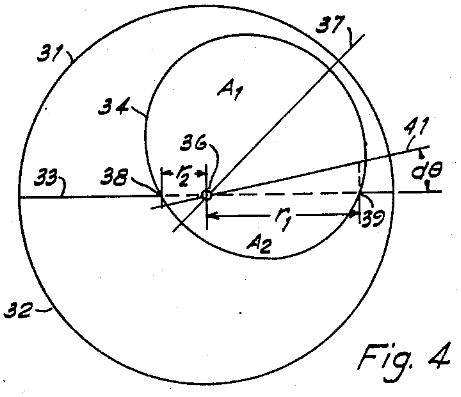
Figure 4 illustrates the method of design of a sine condenser.

The shape of the rotor plate may be calculated from the relation expressed supra in Relation 1 if fringe effects be neglected. In Fig. 4, 31 and 32 represent two stator plates which are very close to each other at line 33. Rotor plate 34 is pivoted at 36 and is shown oriented with the direction of its shortest dimension 37 at an angle to the junction line 33 so that greater capacity exists between the rotor and plate 31 than between the rotor and plate 32 in accordance with the well-known relation $$C = \frac{KA}{4\pi d} \quad (2)$$

where C is the electrostatic capacity, K is the dielectric constant, $d$ is the thickness of dielectric and A is the effective area of dielectric. A is taken as the area of that part of the rotor which in Fig. 4 overlies a stator plate. For calculation of the capacity between the rotor and stator plate 31 this area is that enclosed above line 33 indicated as $A_1$, and for calculation of capacity between the rotor and stator 32 the area is that below line 33 indicated as $A_2$. Relation 1 then may be written $$A_1 - A_2 = k \sin\theta \quad (3)$$

where $k$ represents $$\frac{4\pi d}{K}$$

and a dimensional constant. Differentiating Equation 3 the expression $$dA_1 - dA_2 = k \cos\theta d\theta \quad (4)$$

is obtained.

In Fig. 4, a clockwise rotation of the rotor until the line 41 coincides with line 33, being a displacement through angle $d\theta$, increases the area $A_2$ covering stator 32 by $\frac{1}{2} r_1^2 d\theta$, where $r_1$ is the radius from center 36 to point 39, minus $\frac{1}{2} r_2^2 d\theta$, where $r_2$ is the radius from center 36 to point 38. Similarly, area A would be decreased by the same amount, so that Equation 4 becomes $$dA_1 - dA_2 = 2dA_1 = r_1^2 d\theta - r_2^2 d\theta = k \cos\theta d\theta \quad (5)$$

or $$r_1^2 - r_2^2 = k \cos\theta$$

Now, choosing any convenient ratio between $r_1$ and $r_2$ for $\theta = 0$, such as 3/1, a rotor may be designed, symmetrical about its long axis, which satisfies Equation 5. Further refinement of design to take account of fringing and other disturbing effects can most easily be effected by the cut and try method, but the required corrections will be small.

It is obvious that the design of the rotor of the variable condenser used in this invention need not be confined to such a shape as to resolve the condenser displacement angle in terms of sine or cosine. The displacement angle may instead be resolved in terms of any other function required by the intended use by the same general design procedures outlined supra, within limitations of mechanical design. For instance, if a function such as tangent is to be employed the useful movement must be restricted to less than 90° in each quadrant since at values of this function near infinity the physical sizes and relationships of the condenser parts would become impracticably large.

Returning to Fig. 1, the alternating current generator 42 supplies alternating charging voltage to the differential condenser 11. This generator preferably should supply a square or other flat-topped and flat-bottomed waveform voltage, but may supply an alternating voltage of any form so long as the shape is fixed and the peak-to-peak voltage is definite and under control. The frequency of the voltage output of this generator comprises one input datum; its voltage magnitude may be employed as a second input datum.

Generator 42 charges rotor 12 alternately positively and negatively with a quantity of charge $Q = CV$, where C is the total capacity of rotor 12 and both stators 13 and 14, and V is the potential to which charged. The same charge is applied by induction to each of the stator plates 13 and 14 in the proportion of their respective capacities $C_1$ and $C_2$, each receiving substantially its entire charge, positive or negative, during any positive or negative half cycle because the capacities and resistances are made such that the time constants are small compared with the duration of a half cycle. The total quantity of positive or negative charge applied through a stator set 13 or 14 to the diode bridge 16 in one second will therefore be the quantity per half cycle multiplied by the number of cycles per second, or the frequency $f$ of the output of generator 42. Positive charges on the stator 13 will flow through diode 43 to ground when the voltage is above that of fixed bias battery 52 and negative charges on stator 14 will also flow to ground through diode 44 when more negative than the potential of battery 53. On the other hand negative charges on plates 13 will flow through diode 46 into condenser 48, the other plate of which is grounded and positive charges on plates 14 will flow through diode 47, into the same condenser 48. The provision of fixed bias batteries 52 and 53 acts to compel operation of the diodes over a preferred part of their characteristic.

The amount of the charge flowing into condenser 48 per second from stator 13 will be $$Q_1 = C_1 V f \quad (6)$$

and from stator 14, $$Q_2 = C_2 V f \quad (7)$$

The difference will be, from Equation 1

$$Q_1 - Q_2 = Vf(C_1 - C_2) \sim Vf \sin\theta \quad (8)$$

That is, the preponderance of negative charge (from plates 13) at point 49 of bridge 16 over positive charge (from plates 14) per second is directly proportional to the sine of the angle at which the shaft of condenser 11 is set multiplied by the voltage and frequency. Now if the potential of point 49 be kept at some fixed reference potential, the preponderance of positive or negative charge at this point will flow off as fast as impressed thereon and the rate of flow, or electrical direct current, will be a direct measure of the above angular setting. That is, $$i_1 = kQ_1 \quad (9)$$

where $i_1$ is the current flowing through diode 46 from condenser 48 due to charge $Q_1$ from plates 13, and $k$ is a proportionality constant. Similarly $$i_2 - kQ_2 \quad (10)$$

$i_2$ being the current flowing through the diode 47 toward the condenser 48 due to the charge $Q_2$ from the plate 14. These equations are simply the statement of the basic definition of current as the amount of charge which flows in unit time.

Since it has been assumed that the point 49 is kept at a fixed potential, the current $i_3$ supplied through conductor 50 must equal the difference of the currents $i_1$ and $i_2$, or from (8), (9) and (10)

$$i_1-i_2=i_3=k(Q_1-Q_2)=kVf\ \sin\theta \qquad (11)$$

Lead 50 is connected to a load 51 which may be of any type that can supply a current such as $i_3$ and indicate its magnitude, while preferably not requiring any power to be supplied to it through lead 50 and preferably also furnishing an indication of the time integral of the current $i_3$.

Figure 6:
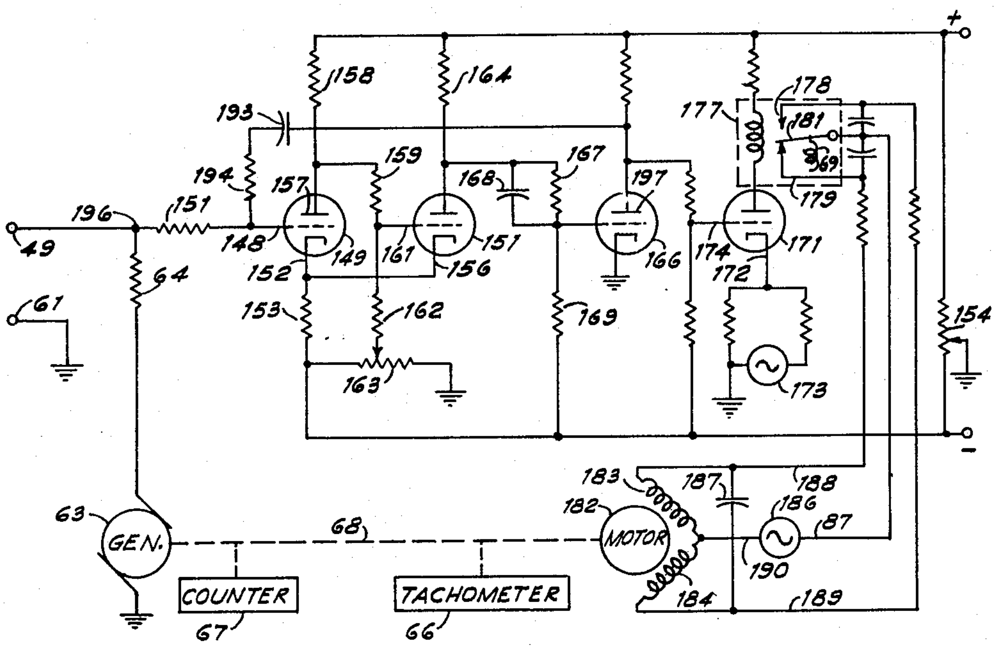
Figure 6 shows schematically one arrangement of a load, energized from one point of the rectifier bridge.

Several forms of such load can be constructed, and for purposes of illustration the form may consist of a very high gain amplifier, a motor-generator, a tachometer and a counter as illustrated in Fig. 6. Here the input terminals 49 and 61 are the same as the like-numbered terminals of Fig. 1. Terminal 49 is maintained substantially at ground potential by negative feedback supplied through the loop including motor 182, generator 63 and resistor 64. The magnitude of current supplied through this loop is proportional to the speed of generator 63, which is indicated by tachometer 66, and which therefore also indicates the product of input voltage, input frequency, and the sine of condenser angle. The time integral of this product is indicated by the accumulated reading of counter 67 giving revolutions of shaft 68 connecting the motor to the generator.

When the instant invention is applied to construction of a resolver such as might be employed in aerial navigation, with a frequency $f$ proportional to speed of the vehicle and condenser angle $\theta$ representative of the course azimuth angle, the current $i_3$ will be representative of the component of speed in an east-west direction if the condenser is a sine resolver, and will be representative of the component of speed in a north-south direction if the condenser is a cosine resolver. The integral of the current $i_3$ in each case will of course be the total distances traveled in the east-west and north-south directions respectively.

Since the output electrical quantity of this invention is actually proportional to the voltage as well as the frequency of the input generator, the voltage instead of the frequency might be utilized in the above example as one of the input data. Whichever is not so used, voltage or frequency, may be held constant, or it may be made manually adjustable to provide a convenient operational calibration adjustment, or it may be used as a geoidal correction data input as previously mentioned.

Referring to Fig. 1, load 51 may be constructed as shown in Fig. 6, where input terminals 49 and 61 are the same as the terminals of Fig. 1 bearing identical reference characters. Let it be assumed that during operation the potential across these terminals varies slightly so that the potential of terminal 49, Fig. 6, tends to rise slightly. Then this reduction of bias of the grid 148 with respect to its cathode 152 will result in an increased anode current flow through the tube 149. Such an increased current flow, however, results in a decreased potential being applied to the anode 157 as a result of the increased drop in the anode resistor 158. This reduction in anode potential likewise results in a reduction of the potential applied to the grid 161 so that the bias of this grid as respects its cathode 156 is increased resulting in a reduced anode current flow in this tube. The anode current of tube 151, however, flows through the resistor 153 connected in the cathode circuit of tube 149 so that a reduction in the current reduces the potential drop produced across this resistor and hence reduces the potential of the cathode 152. Because it is the relative potential of cathode and grid which controls the output of the tube, the reduction of cathode potential amounts to the same thing as an increase in potential of the grid and it is not necessary for the grid potential to increase to increase the output of the tube.

At first glance, it may seem paradoxical that an increase in input applied to the terminals 49 and 61 may result in an increase in output without a concomitant increase of potential at the grid 148 but circuit parameters may be so chosen for the interconnected network above described that not only may the potential of the cathode 152 be so varied in an opposite direction as to cause the grid potential to remain stationary over a reasonable operating range but even over-compensation may be obtained if such were desired whereby the grid potential is actually decreased as the input is increased. This situation obtains, of course, only up to the saturation of the tubes 149 and 151 and as a practical matter it is not necessary that the grid potential be held to an absolute zero but only that its change in potential be insignificant as compared with other factors which might introduce errors of integration such as tube drift and the like. Likewise, the stages 149 and 151 need not be comprised of separate tubes as shown but may consist of two triode sections in a single envelope.

The output of tube 151 obtained from the potential drop produced across the anode resistor 164 is impressed on the input of tube 166 through the network consisting of resistors 167 and 169 and condenser 168. The output of tube 166 is in turn resistance coupled to the input of the final stage 171 which has its cathode 172 connected to have a small alternating current potential impressed thereon from the alternating current source 173 so that the bias on this tube fluctuates between limits which are determined by the signal potential applied to the grid 174.

There will be then a fluctuating current in the anode circuit of this tube the average values of which is determined by the signal potential applied to the input of the tube. This fluctuating potential is caused to flow through the actuating coil 176 of a relay 177 which additionally includes a pair of substantially fixed contacts 178 and 179 and a spring armature 181 actuated by the current flowing in the coil 176.

The circuit parameters are such and the armature 181 is so biased by spring 69 that when there is a certain input to the tube 171, the fluctuations of anode current thereof are such as to cause the armature 181 to engage the contacts 178 and 179 for equal lengths of time as the anode current fluctuates from its maximum to its minimum as a result of the alternating potential impressed on the cathode 172. When, however, the signal potential is increased the average anode current is also increased and the armature 181 will be caused to engage the contact 178, for example, for a larger period of time during a cyclic variation than it engages contact 179 and conversely when the signal potential is decreased the armature 181 engages the contact 179 for a longer period of time than it engages the contact 178, the relative periods of time being dependent on the value of the signal potential.

This action controls the direction and speed of rotation of the motor 182 in the following manner: The motor 182 is a two phase motor having field coils 183 and 184 wound 90° out of phase as respects each other. If these field coils are supplied with alternating current energy and the current in one coil is made to lead the other by 90° the motor will rotate in one direction whereas if the current in the second coil is made to lead that in the first by 90° the motor will rotate in the opposite direction.

When the armature 181 engages contact 179, alternating current is supplied from the source 186 to the field coil 183 through a circuit which includes the conductor 87, armature 181, contact 179, conductor 188, field coil 183 and conductor 190 back to the source 186. On the other hand, the circuit which supplies energy to the field coil 184 includes the conductor 87, armature 181, contact 179, conductor 188, condenser 187, field coil 184 and conductor 190. Because the condenser 187 is included in the circuit which energizes the field coil 184 the current through this coil leads that supplied to coil 183 by 90° and the torque applied to the motor is such as to cause it to tend to rotate in say a counter-clockwise direction. When, however, the armature 181 is caused to engage the contact 178 it will be apparent that the circuit connections are reversed, the condenser 187 now being included in the circuit which energizes field coil 183 and field coil 184 being connected directly to the source. This current flowing through the field coil 183, therefore, now leads that flowing through field coil 184 and the torque applied to the motor is such as to cause it to tend to rotate in a clockwise direction.

If the armature 181 is vibrated rapidly, say at sixty cycles per second, and this armature engages contacts 178 and 179 for exactly equal intervals of time, the motor 182 will tend to rotate first in one direction and then the other under equal and opposite torque impulses. Because the motor has some inertia and the equal and opposite torque impulses are rapidly applied no rotation will occur. However, if the armature 181 engages one of the contacts 178 and 179 for a longer interval than it does the other, there will be a resultant torque developed by the motor 182 which will tend to rotate it in one direction or the other at a speed which is determined by the relative time engagement of the contacts 178 and 179 and hence the relative unbalance of opposing torques developed in the motor.

It will be apparent, therefore, that the varying signal input to the tube 171 will produce a rotation of the motor 182 in one direction or the other at a speed which is approximately proportional to that input.

The motor 182 rotates shaft 68 which is connected to tachometer 66, counter 67 and generator 63. The latter supplies current to point 49 through resistor 64 of resistance $R_1$ so that current $i_3$ will be supplied to terminal 49 of such polarity as to neutralize the slight tendency of that terminal to change in potential.

A memory circuit consisting of resistor 194 and capacitor 193 eliminates the effect of short-time disturbances and prevents any tendency to hunt as is fully described in the copending application, Serial No. 51,610, filed September 28, 1948, of John W. Gray.

Figure 5:
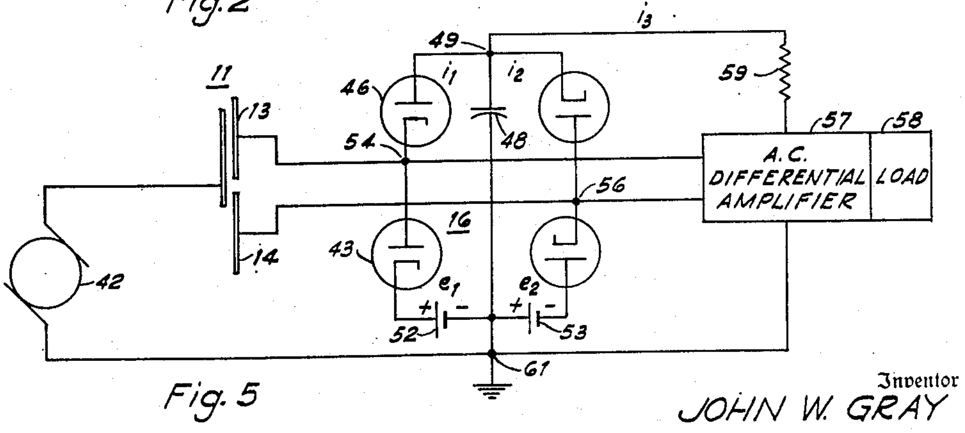
Figure 5 is a schematic diagram of another embodiment of the computer.

A second embodiment of this invention is shown in Fig. 5 employing alternating voltage take-off to the utilizing load instead of direct current take-off. The generator 42, differential condenser 11, and diode bridge 16 all are of the same structure and operation as described in connection with Fig. 1. Likewise, the outputs of the stator plate sets 13 and 14 consist of quantities of electricity proportional to the product of the voltage and frequency of the square wave input and of the designed function of the input condenser angle, and resulting in currents $i_1$ and $i_2$ flowing into and out of terminal 49, with this terminal normally maintained at a constant reference voltage by the introduction of difference current $i_3$ from some source in the utilizing load. However, the signal to the load is not taken from terminal 49, but to secure greater stability is taken from terminals 54 and 56, which are those terminals of the diode bridge to which the sine condenser 11 is connected. These terminals will normally fluctuate in square wave manner over a small voltage range, and when the bridge is in balance these voltages will be equal. These voltages are impressed on an alternating current differential amplifier 57, the output of which is connected to and operates a load 58 which may be any desired type of integrator. The amplifier also normally supplies the current $i_3$ demanded by terminal 49 at balance.

This operation is accomplished as follows: Assume that fixed bias batteries 52 and 53 have potentials of $e_1$ and $e_2$ volts, and that $i_1-i_2=i_3$. Then when the stator 13 is positive, it must be more positive than the potential $e_1$ before current will flow through tube 43 to ground, and when this stator is negative it must be more negative than ground potential before current will flow through tube 46 from terminal 49 and condenser 48, causing the terminal 54 to fluctuate between ground potential and $e_1$ volts. Similarly terminal 56 will fluctuate between ground potential and $-e_2$ volts. These two potential ranges will therefore equal $e_1$ and $e_2$ respectively and by making $e_1$ equal to $e_2$, the differential input to amplifier 57 will be zero. If, however, any input data change varies currents $i_1$ or $i_2$, their difference no longer will equal the current $i_3$, and because of the drop in resistor 59 the potential of point 49 will depart from its reference value, increasing one output voltage and correspondingly decreasing the other at the terminals 54 and 56 connected to the input of the amplifier 57. Thus a differential voltage will appear at the amplifier input with the result that the amplifier output will be varied and more or less current, $i_3$, will be produced as the situation may require, restoring the balance and reducing its differential input voltage to approximately zero. The variation of amplifier output which as indicated by Equation 11 is a function of the input voltage, its frequency and the position of the rotor shaft may then be utilized to operate a load 58 in any desired manner depending on the application to which the invention is put.

Figure 7:
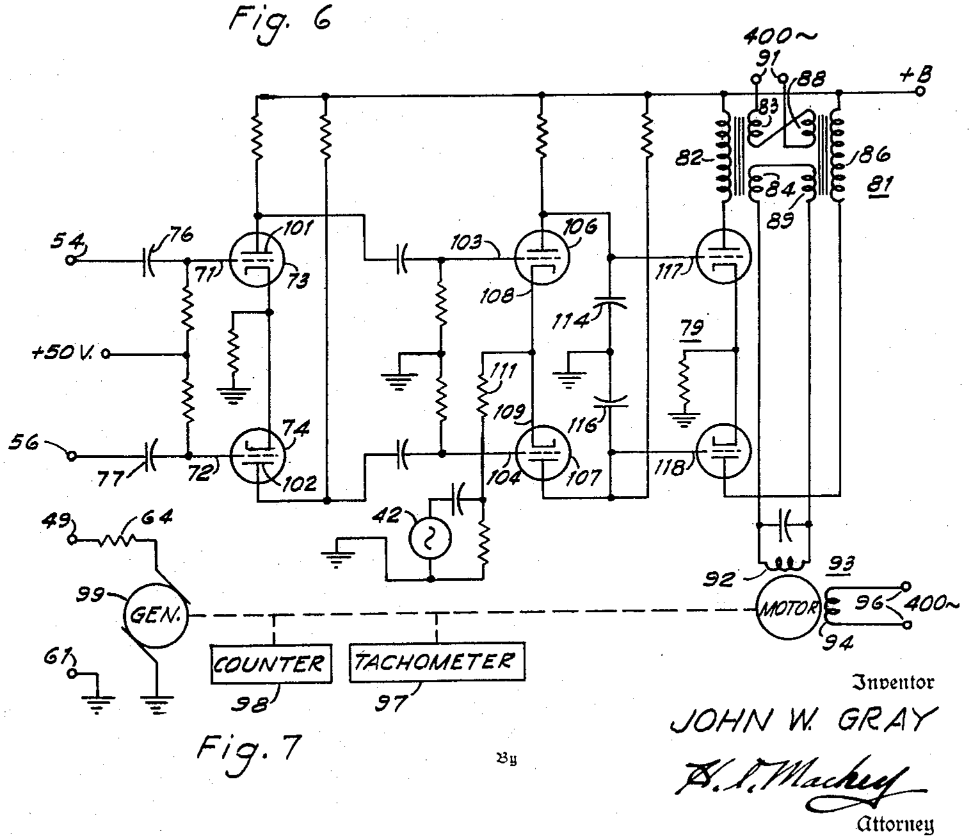
Figure 7 shows schematically another arrangement of a load, energized from two points of the rectifier bridge.

One form of amplifier 57 and load 58 which has been successfully operated is shown in Fig. 7. Here input terminals 54 and 56 and current output terminals 49 and 61 correspond to the terminals in Fig. 5 bearing the same reference characters. The fundamental difference between this form of load and that of Fig. 6 is that here the input signal is applied at a point different from that from which the compensating current $i_3$ is taken.

When the capacities of condenser stators 13 and 14, Fig. 5 are equal, currents $i_1$ and $i_2$ are equal and potential changes effective on terminals 54 and 56, Fig. 7 will be equal. When these potentials are impressed on grids 71 and 72 of triode tubes 73 and 74 through blocking condensers 76 and 77, their zero reference voltages are shifted so that simultaneously equal potentials appear on these grids. Opposite phase potentials are applied from the plates 101 and 102 to the grids 103 and 104 of triodes 106 and 107, which constitute a phase-detecting amplifier. This amplifier produces a direct current differential output, operating on only alternate half cycles of input as follows: Its cathodes 108 and 109 are energized at input data frequency from generator 42, which is the same generator depicted in Fig. 5, through resistor 111. During positive half cycles no current will flow through tubes 106 and 107 because their cathodes are highly positive with respect to their grids, but during negative half cycles current will flow. During such half cycles the currents are under control of the grids, so that if a grid is more positive, more current will flow and the plate potential will drop due to loss in the plate resistor. Since the two grids are in phase and equal at all instants in potential, the two plate potentials will be equal. Condensers 114 and 116 are made large enough to substantially smooth the output over the cycle, so that direct voltage is applied to grids 117 and 118 of the direct current amplifier 79. The outputs of direct current are impressed on saturable transformer 81. This transformer has saturating windings 82 and 86 and primary windings 83 and 88, associated respectively with secondary windings 84 and 89. Primaries 83 and 88 are energized by a 400-cycle source at terminals 91 so that the secondaries 84 and 89 may be energized in opposite phase. Therefore in absence of current in the saturating windings 82 and 86, maximum output voltages are generated in secondaries 84 and 89 but they exactly cancel each other, being of opposed phase, and no current flows. When, however, current flows only in winding 82, the associated core is at least partly saturated, and less voltage is induced in secondary 84, so that some current is produced by the voltage in secondary 89. Conversely, current in winding 86 alone reduces the induced voltage in secondary 89, inducing an output current of the phase of secondary 84. With equal saturating currents there is no output current. The two secondary windings are connected in series to a winding 92 of a two-phase motor 93, the remaining winding 94 of which is connected at terminals 96 to a 400-cycle source whose phase is in quadrature to that which may energize winding 92. The latter will have a phase which momentarily depends on whether the current received from secondary 84 is greater or less than the current, 180° out of phase, received from secondary 89. It follows that motor 93 will run in one direction when under control of secondary 84, and in the opposite direction when under control of secondary 89, and if equal currents are received from these secondaries the motor will remain stationary. This is the condition in the assumed case.

If currents $i_1$ and $i_2$ become unequal, voltages applied to grids 71 and 72 no longer remain equal, so that the amount of saturation due to primary 82 no longer remains equal to the amount of saturation due to primary 86, and current from one secondary preponderates over that from the other, causing motor 93 to rotate. This operates tachometer 97, indicating the speed of rotation proportional to frequency, potential and condenser angle at the computer, and counter 98, indicating the integral of the product of these factors, and generator 99, which produces a current $i_3$ and supplies it at terminal 49 to balance the computer. Since this amplifier and feedback may be made very high in gain, a small change in computer conditions can be made to produce a large indicated effect.

What is claimed is:

1. In a computing instrument of the function-generating type, a differential condenser having the difference of its capacitances comprising a first quantity, an alternating generator whose output comprises a second quantity, circuit means connecting one terminal of said generator to said differential condenser, a four-arm bridge comprising four rectifier elements, an electrostatic fixed condenser connected between one pair of bridge terminals, circuit means for connecting a first terminal of said fixed condenser to ground and to the remaining terminal of said generator, means for maintaining the second terminal of said fixed condenser substantially at ground potential, circuit means for connecting said differential condenser output to the two remaining bridge terminals, and means for abstracting from said bridge an electrical quantity representative of the product of said first and second quantities.

2. A device according to claim 1 in which said circuit means for abstracting from said bridge an electrical quantity representative of the product of said first and second quantities is electrically connected to said second terminal of the fixed condenser.

3. A device according to claim 1 in which said circuit means for abstracting from said bridge an electrical quantity representative of the product of said first and second quantities is electrically connected to said two remaining bridge terminals.

4. In a computing instrument of the function generating type for generating the product of a first and second quantity and of a third quantity representing a function of a shaft displacement angle, an electrostatic variable rotary differential condenser comprising two capacitors which vary in opposite sense as functions of the angular displacement of a common actuating shaft, the difference of the capacitances of said two capacitors being proportional to a specific function of said angular displacement and comprising said third quantity, an alternating generator whose frequency of alternation comprises said first quantity and whose output potential comprises said second quantity, circuit means connecting a terminal of said generator output to said differential condenser input, a four-arm bridge comprising four rectifier elements, a fixed condenser connected between one pair of bridge terminals, circuit means connecting one of said pair of terminals to the remaining terminal of said generator and means for maintaining the remaining terminal of said pair of terminals substanitally at the potential of said last-mentioned generator terminal, circuit means for connecting said differential condenser to the two remaining bridge terminals, and means for abstracting from said bridge an electrical quantity representative of the product of said first, second and third quantities.

5. A device according to claim 4 in which said differential condenser rotor has flat plates approaching an elliptical shape rotating eccentrically about a point in the minor axis, and substantially satisfying the geometrical relation $$r_1^2-r_2^2\sim\cos\theta$$

where $r_1$ and $r_2$ are two opposite radii and $\theta$ is the angle made by one radius with the minor axis.

6. In a computing instrument of the function-generating type for generating the product of a first and second quantity and of a third quantity representing a function of a shaft displacement angle, an electrostatic variable rotary differential flat-plate condenser comprising two capacitors which vary, in opposite sense as functions of the angular displacement of a common actuating shaft, the rotor of said condenser approaching a substantially elliptical shape satisfying the relation $$r_1^2-r_2^2\sim\cos\theta$$

where $r_1$ and $r_2$ are two opposite radii and $\theta$ is the angle made by them with the minor axis, whereby the difference of the capacitances of said two capacitors is proportional to the sine of $\theta$ and comprises said third quantity, an alternating generator whose frequency of alternation comprises said first quantity and whose output potential comprises said second quantity, circuit means connecting one terminal of said generator to said differential condenser input, a four-arm bridge comprising four thermoelectric diodes disposed singly each in one of the four arms of said bridge, circuit means connecting the plate of each diode to the cathode of an adjacent diode, a fixed condenser connected between one pair of bridge terminals, circuit means connecting one of said pair of terminals to the remaining terminal of said generator and means for maintaining the remaining terminal of said pair of terminals substantially at the potential of said last-mentioned generator terminal, circuit means for connecting said differential condenser to the two remaining bridge terminals, and means for abstracting from said bridge at last-mentioned terminal of said fixed condenser an electrical quantity representative of the product of said first, second and third quantities.

7. In a computing instrument of the function-generating type for generating the product of a first and second quantity and of a third quantity representing a function of a shaft displacement angle, an electrostatic variable rotary differential flat-plate condenser comprising two capacitors which vary in opposite sense as functions of the angular displacement of a common actuating shaft, the rotor of said condenser approaching an elliptical shape substantially satisfying the relation $$r_1^2-r_2^2\sim\cos\theta$$

where $r_1$ and $r_2$ are two opposite radii and $\theta$ is the angle made by them with the minor axis, whereby the difference of the capacitances of said two capacitors is proportional to the sine of $\theta$ and comprises said third quantity, an alternating generator whose frequency of alternation comprises said first quantity and whose output potential comprises said second quantity, circuit means connecting one terminal of said generator to said differential condenser input, a four-arm bridge comprising four thermoelectric diodes disposed singly each in one of the four arms of said bridge, circuit means connecting the plate of each diode to the cathode of an adjacent diode, a fixed condenser connected between one pair of bridge terminals, circuit means connecting one of said pair of terminals to the remaining terminal of said generator and means for maintaining the remaining terminal of said pair of terminals substantially at the potential of said last-mentioned generator terminal, circuit means for connecting said differential condenser to the two remaining bridge terminals, and means for abstracting from said bridge at said two remaining bridge terminals an electrical quantity representative of the product of said first, second and third quantities.

8. A device according to claim 7 in which said first quantity comprised of the frequency of alternation of said generator, said second quantity comprised of the output potential of said generator, and said shaft displacement angle are three independently variable quantities constituting the computer input data.

9. A device according to claim 7 in which said first quantity comprised of the frequency of alternation of said generator, and said shaft displacement angle are two independently variable quantities constituting the computer input data, and said second quantity comprised of the output potential of said generator is a constant.

10. A device according to claim 7 in which said second quantity comprised of the output potential of said generator, and said shaft displacement angle are two independently variable quantities constituting the computer input data, and said first quantity comprised of the frequency of alternation of said generator is a constant.

11. In a computing instrument of the function-generating type for generating the product of a first quantity and of a second quantity representing a function of a shaft displacement angle, an electrostatic variable rotary differential flat-plate condenser comprising two capacitors which vary, one directly and one inversely, as functions of the angular displacement of a common actuating shaft, the rotor of said condenser approaching an elliptical shape substantially satisfying the relation $$r_1^2-r_2^2\sim\cos\theta$$

where $r_1$ and $r_2$ are two opposite radii and $\theta$ is the angle made by them with the minor axis, whereby the difference of the capacitances of said two capacitors is proportional to the sine of said angular displacement and comprises said second quantity, an alternating generator which generates an electrical quantity comprising said first quantity, circuit means connecting one terminal of said generator to said differential condenser input, a four-arm bridge comprising four thermoelectric diodes disposed singly each in one of the four arms of said bridge, circuit means connecting the plate of each diode to the cathode of an adjacent diode, a fixed condenser connected between one pair of bridge terminals, circuit means connecting one of said pair of terminals to the remaining terminal of said generator and means for maintaining the remaining terminal of said pair of terminals substantially at the potential of said last-mentioned generator terminal, circuit means for connecting said differential condenser to the two remaining bridge terminals, and means for abstracting from said bridge an electrical quantity representative of the product of said first and second quantities.

12. A computing instrument in accordance with claim 11 in which said electrical quantity comprising the first quantity is frequency of alternation.

13. A computing instrument in accordance with claim 11 in which said electrical quantity comprising the first quantity is generated potential.

References Cited in the file of this patent

UNITED STATES PATENTS

| Number | Name | Date |
|---|---|---|
| 1,620,020 | Hardy | Mar. 8, 1927 |
| 2,401,527 | Vance | June 4, 1946 |
| 2,433,236 | Rajchman et al. | Dec. 23, 1947 |
| 2,433,237 | Rajchman et al. | Dec. 23, 1947 |